United States Patent [19]

Hagihara et al.

[11] Patent Number: 5,107,498
[45] Date of Patent: Apr. 21, 1992

[54] AUTOMATIC TESTING METHOD FOR INFORMATION PROCESSING DEVICES

[75] Inventors: Toshio Hagihara, Owariasahi; Yoshihiko Uchikawa, Kasugai; Kenji Sato; Akio Emoto, both of Owariasahi; Tomoyasu Kato, Seto, all of Japan

[73] Assignees: Hitach, Ltd., Tokyo; Hitachi Asahi Electronics Co., Ltd., Owariasahi, both of Japan

[21] Appl. No.: 407,121

[22] Filed: Sep. 14, 1989

[30] Foreign Application Priority Data

Sep. 19, 1988 [JP] Japan .................. 63-234443

[51] Int. Cl.$^5$ .......................... G01R 31/28
[52] U.S. Cl. .................... 371/15.1; 371/22.1
[58] Field of Search ............ 371/16.1, 21.1, 28, 371/15.1, 22.1; 364/267.1

[56] References Cited

U.S. PATENT DOCUMENTS

| | | | |
|---|---|---|---|
| 3,969,618 | 7/1976 | Strubel et al. | 371/21.1 |
| 4,499,581 | 2/1985 | Miazga et al. | 371/16.1 |
| 4,837,764 | 6/1989 | Russello | 371/16.1 |
| 4,885,683 | 12/1989 | Coogan | 364/200 |

FOREIGN PATENT DOCUMENTS 62-247434 10/1987 Japan .

Primary Examiner—Charles E. Atkinson
Attorney, Agent, or Firm—Kenyon & Kenyon

[57] ABSTRACT

A method successively test information processing devices, that include a main storage, a CPU, an external storage, etc., in a plurality of test steps in accordance with test programs along a test line composed of baths with different temperatures/humidities. A table and a pointer corresponding to the table are stored in an external storage and a non-volatile memory, respectively. A test program, test items and a test procedure are previously described for each test step in the table. The test object is shifted to a certain bath on the test line, and a prescribed test for the test object is performed at the timing of turning-on of the driving power therefor in accordance with the test procedure described in the procedure table corresponding to the pointer. The value of the pointer is updated each time the power is turned on. The test program is always updated referring to the pointer even when the test steps are successively advanced to repeat the on/off action of the power, thereby automatically performing a series of test steps.

15 Claims, 4 Drawing Sheets

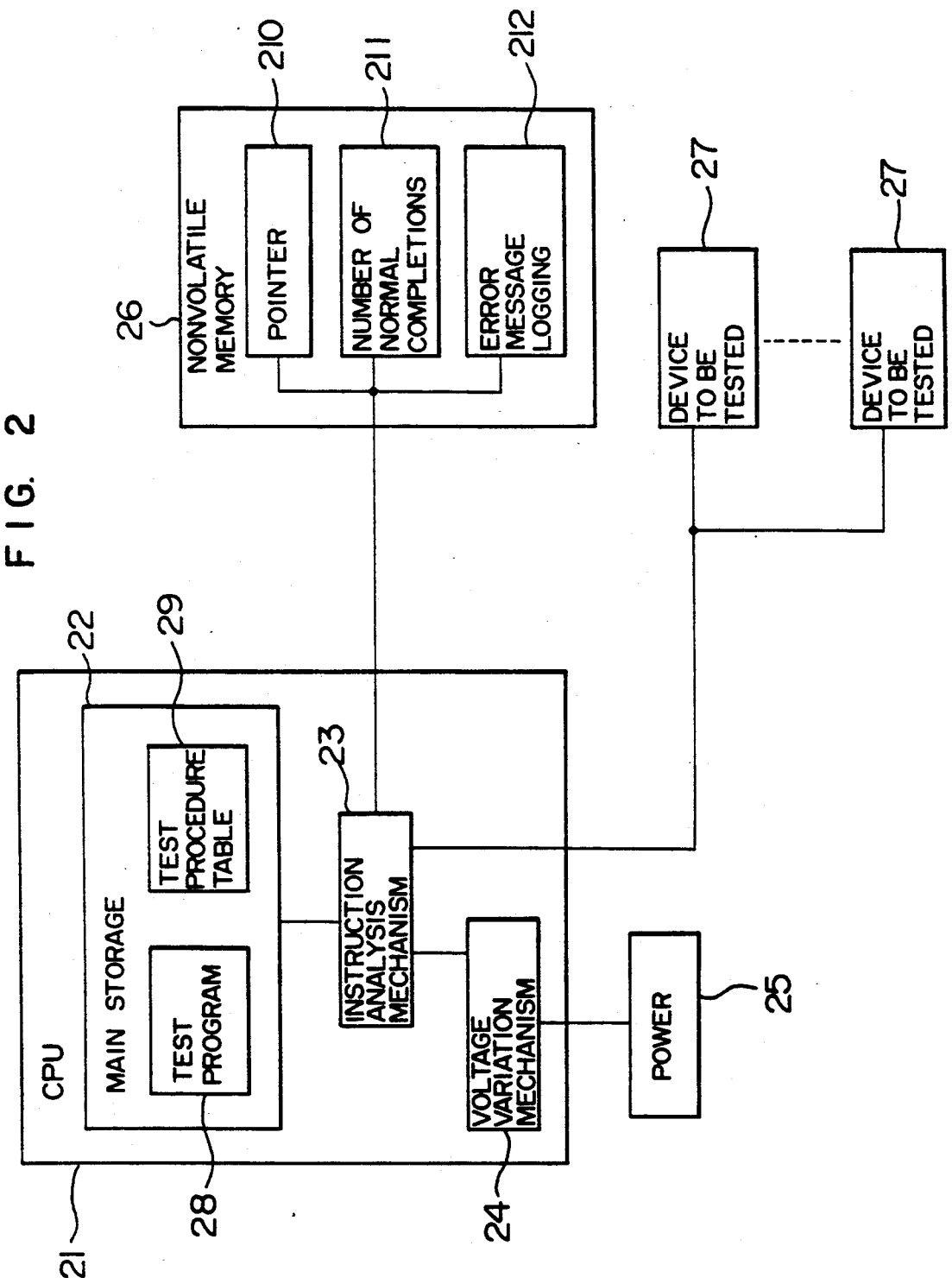

FIG. 2A  TEST PROCEDURE TABLE

← 16 BYTE →

| TEST MODE | TEST NO. | TEST BLOCK | NUMBER OF EXECUTION | VOLTAGE DATA | SPARE |
|---|---|---|---|---|---|
| 0002 | 0000 | 0000 | 0000 | 0001 | |
| 0001 | 0001 | 0002 | 0010 | 0000 | |
| 0001 | 0002 | 0003 | 0005 | 0000 | |
| 0003 | 0000 | 0000 | 0000 | 0000 | |
| 0002 | 0000 | 0000 | 0000 | FFFF | |

POINTER ADDRESS

TEST MODE:
0001: TEST EXECUTION
0002: VOLTAGE SETTING
0003: TEST END (IDLE)

TEST NO:
0001: FD TEST
0002: DK TEST

TEST BLOCK: PROCESSING BLOCK FOR EACH TEST ITEM
: E.G. READ/WRITE FOR FD TEST

NUMBER OF EXECUTIONS: REPETITION NUMBER OF TEST BLOCK
VOLTAGE DATA: VOLTAGE SET BY PROGRAM
    FFFF : 4.5V
    0000 : 5.0V
    0001 : 5.5V

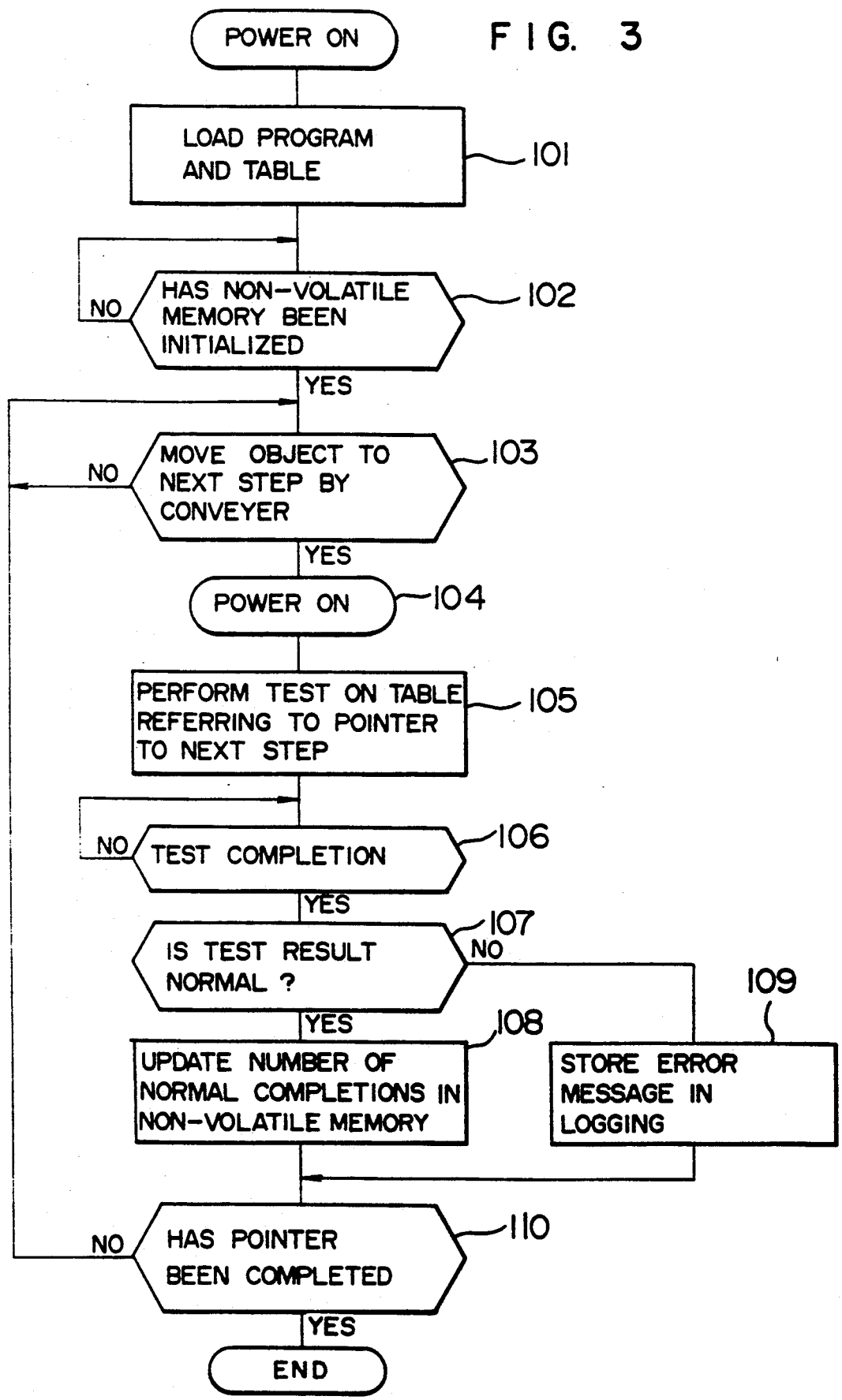

ns to testing of information processing devices, and more particularly to an automatic test programming method for performing a testing process without human intervention during a mass production of information processing devices and an apparatus used for such testing.

AUTOMATIC TESTING METHOD FOR INFORMATION PROCESSING DEVICES

BACKGROUND OF THE INVENTION

The present invention relates to testing of information processing devices, and more particularly to an automatic test programming method for performing a testing process without human intervention during a mass production of information processing devices and an apparatus used for such testing.

In the process of manufacturing information processing devices such as work stations, a mass production testing line includes a plurality of testing steps or processes in an aging bath, so that an operator cannot intervene in the testing line. Moreover, in the respective steps in the aging bath, testing items must be changed by changing the environmental condition such as temperature, humidity, etc. To do so, a testing program is required to have a function of: automatically executing a prescribed test for each step on the unattended testing line; storing the testing results; and indicating the testing results after all of the tests have been completed.

In a conventional automatic testing or diagnosis method for computer systems as is disclosed in JP-A-62-247434, flags in an automatic running mode are arranged in a diagnosis program monitor to define the execution procedure of the program. The diagnosis program is thereby stored in an external storage and the diagnosis program monitor is automatically loaded in a main storage, so that a general diagnosis program can be automatically executed without any operation by operators. In this way, the conventional testing/diagnosis method is organized to be able to automatically execute the general diagnosis program. However, it does not deal with a plurality of testing steps, and besides, it could not change the contents of test in accordance with different steps. Moreover, it does not; perform the function of monitoring the repetition of power-on and off for the system to be tested, which is involved in advancing the steps on the testing line.

As understood from the above description, in the conventional test program, a "heat-run" test is carried out endlessly for unattended testing. This method, however, is premised on the condition that the system to be tested is in the power on state during the testing. Therefore, in cases where the testing process is subdivided so that the system to be tested is subjected to several load conditions by changing the testing environment, no consideration is given for providing an unattended test system including the power on-off involved in automatically advancing the steps in the testing line, and the power on-off for so-called "cold-start testing", which is a testing under a minimum installed state (non-energized state) of the system. As a result, the advancement of steps on the testing line could not be automatically carried out.

SUMMARY OF THE INVENTION

The invention provides a method of testing information processing devices which can automatically run without manpower, including automatic power on-off operations involved in an automatic shifting through the various steps in a testing line, thereby realizing savings in labor, prevention of malfunctions and safety improvements.

In accordance with one feature of the present invention, a method of testing information processing devices successively tests a plurality of information processing devices, which each include a processor, main storage, external storage, etc., under different temperature/humidity environments in accordance with a test control program. The method includes the steps of preparing a procedure table or the like including a different testing item and procedure for each step or process; storing pointers of the table in a read/write non-volatile memory such as an external storage which may also be an object to be tested; loading the test program and the procedure table in response to power-on of an object to be tested; initializing the contents of the non-volatile memory are initialized in an initial testing step; under control of the test program, referring to the pointer on the non-volatile memory, and performing a test defined in a test item in the table indicated by the referred to pointer each time execution of the previous test item is completed, and then, updating the value of the pointer in the volatile memory each time the test item execution is completed. This method permits automatic execution of different test procedures for respective steps.

In a first aspect of the present invention, the procedure table includes a procedure of carrying out read/write testings for a magnetic recording device under different temperature/humidity environments, thereby automatically performing the temperature/humidity change test for the magnetic recording device.

In a second aspect of the present invention, said procedure table includes, for testing for a refresh memory which requires refreshing in order to hold written information, a sub-procedure of reading out the information after a prescribed time has elapsed from the time of writing, thereby automatically performing the testing for the refresh memory.

In a third aspect of the present invention, said procedure table includes, for testing for an information processing device provided with means for changing a program using a power supply voltage, a sub-procedure of changing the power supply voltage, thereby automatically performing the testing of the device with different power supply voltages for respective steps.

In a fourth aspect of the present invention, said read/write non-volatile memory has a write enable address for testing a write-once type recording medium and the test program is updated by referring to an associated address whereby the write test for the write-once type recording medium is automatically performed.

In a fifth aspect of the present invention, the read/write enable non-volatile memory stores a testing result for each testing step, and the processor displays the testing results edited in a list form after all the steps have been completed.

In the present invention, a procedure table in which a test program, testing items and test procedure are described for each testing step, and a pointer for the table are prepared and stored in a non-volatile memory or an external storage, a testing is carried out at the timing of power-on, in accordance with a test item in the table indicated by the pointer, and then, the pointer in the non-volatile memory is updated each time of power or each time execution of a test item is completed. Thus, in the case where there are a plurality of testing steps and the testing steps are successively moved, in location even if an on-off action of the power is repeated, the test program will always refer to the pointer on the non-volatile memory, and a test will be carried out in accordance with testing items (and procedures) in the table indicated by the pointer referred to. Each time of turning power on the test program updates the pointer in the non-volatile memory so as to indicate the next test program, testing item and test procedure in the table. As a result, a series of testing steps can be carried out without intervention by an operator.

BRIEF DESCRIPTION OF THE DRAWINGS

FIG. 2 is an arrangement diagram of the information processing device to be tested.

FIG. 2A is a diagram illustrating a test procedure table.

FIG. 3 is an operation flow chart of a testing method according to one embodiment of the present invention.

DETAILED DESCRIPTION

Figure 1:
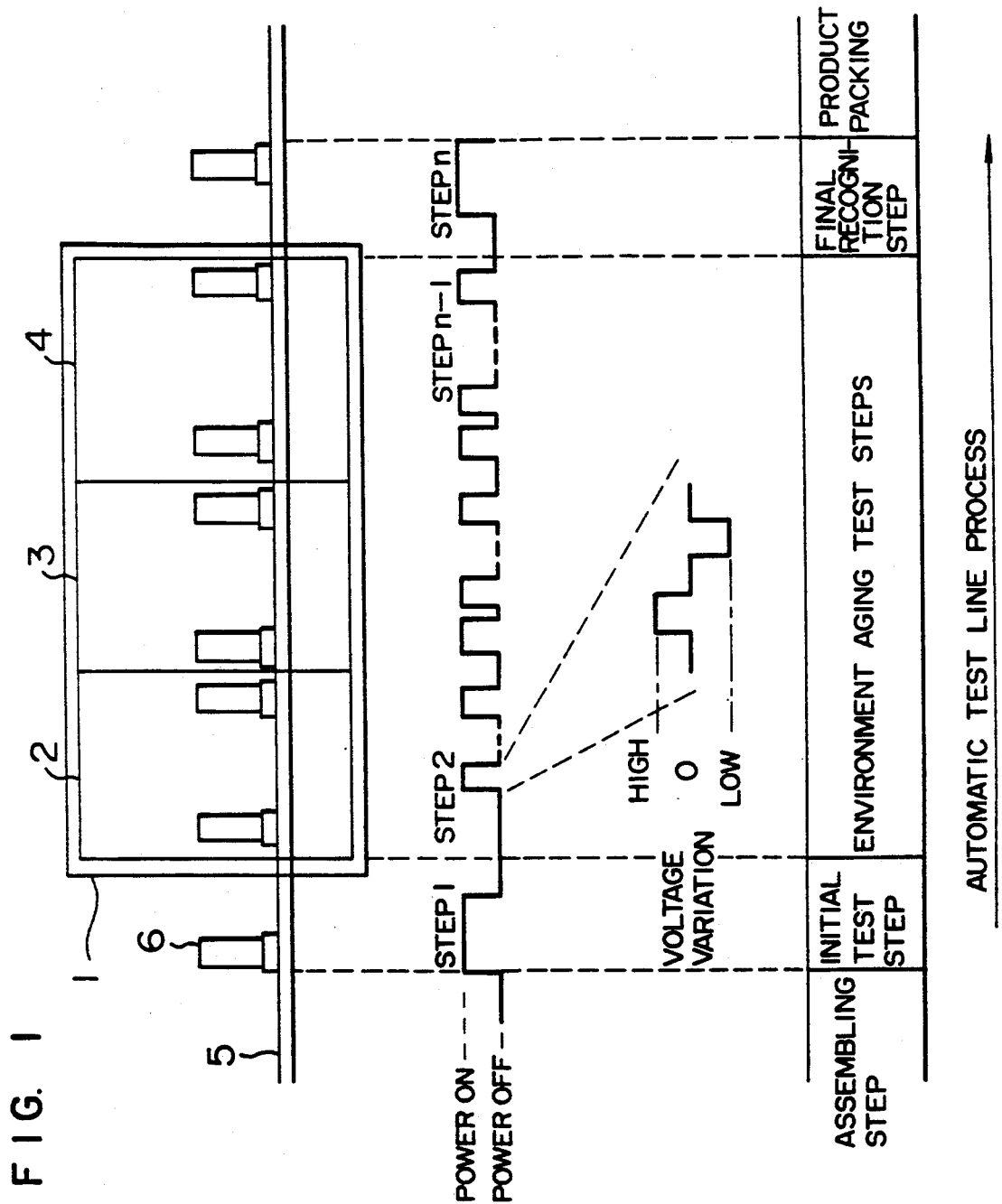
FIG. 1 is a conceptual diagram of an automatic testing line process showing one embodiment of the present invention.

Referring to the drawings, explanation will be given for one embodiment of the present invention.

FIG. 1 is a conceptual diagram of an automatic testing line process showing one embodiment of the present invention. In FIG. 1, a reference numeral 1 denotes an environmental change bath which is subjected to changing of the environment such as temperature; 2 denotes a low temperature bath; 3 denotes a temperature change bath; 4 denotes a high temperature bath; 5 denotes a conveyer line; and 6 denotes information processing devices under test (products). The status levels of on/off state of power for respective steps are shown by "POWER ON" and "POWER OFF". For STEP 2, voltage changes to a high level, zero level and a low level are illustrated.

As shown in FIG. 1, the automatic testing line process is continuous on the conveyer line 5 after an assembling step, and comprises an initial test step (STEP 1), a plurality of testing steps (environment aging steps, STEPS 2 to n−1) which are carried out in the environment change bath, and a final recognition testing step (STEP 2). A packing step follows the testing line process. The initial testing step and final recognition step are attended to by operators. In the initial testing step, a test program medium is set and a simple test is carried out. In the final recognition step, the testing results are evaluated to sort the products tested. The environment bath 1 comprises the low temperature bath 2, the change temperature bath 3 and the high temperature bath 4, and the inside of the environment bath 1 is placed in an unattended state. A plurality of testing steps, which are allotted to respective time units, are automatically carried out in the environment change bath 1 for the products 6 on the moving conveyer line 5. The power for the products on the conveyer line 5 is turned on and off as the products advance through the testing steps, either by a program or mechanical means. A testing program is previously set for each testing step, and also, further detailed test items, including testing voltage variations, are previously set in the testing step. For example, if the products 6 to be tested are magnetic disk devices, test data written at a specific address in the low temperature bath are subjected to only a read-out test until the devices are provided to the high temperature bath 4 and in the high temperature bath, they are first subjected to the read-out test and then to a write-once test.

FIG. 2 is an arrangement diagram of the information processing device to be tested, which shows one embodiment of the present invention. In FIG. 2, a reference numeral 21 denotes a central processing unit (CPU) which is an object to be tested or it can be an object; involved in testing other objects such as elements 27 described below 22 denotes a main storage; 23 denotes an instruction analysis mechanism which includes a known logic or arithmetic unit; 24 denotes a voltage varying mechanism for generating high, middle and low level voltages for testing; 25 denotes a power supply; 26 denotes a non-volatile memory; 27 denotes devices to be tested such as a magnetic recording device, refresh memory and optical memory; 28 denotes a test program stored in the main storage 22; 29 denotes a test procedure table stored in the main storage 22; 210 denotes a pointer area of the procedure table stored in the non-volatile memory 226; 211 denotes an area for storing the number of normal completions of testing in the non-volatile memory 26; and 212 denotes an area for logging error messages in the non-volatile memory 26. A test procedure table format is indicated in FIG. 2A by way of example.

As seen from FIG. 2, the CPU 21 is an object to be tested and the main storage 22 in the CPU stores a table 29 having information on procedures for testing and a test program 28 for performing the testing. Moreover, the pointer 210 for pointing to a procedure to be retrieved from the procedure table 29 is stored in the main storage in an area which is battery backed up or in the non-volatile memory which is an external storage, connected with the CPU 21. Therefore, by externally initializing the pointer 210, the CPU 21 automatically reads out the testing procedure from the table 29 without any operation by an operator and executes the test program 28, thereby completing the test in accordance with the test procedure.

Now, it is assumed that the information processing device to be tested comprises not only the CPU 21, which is itself an object under test and in which the main storage 22, the instruction analysis mechanism 23 and the voltage variation mechanism 24 are included; the power supply 25; the non-volatile memory 26; but also a group of devices 27 to be tested. After the completion of the initial test step, in response to power-on of the device to be tested, a test program and a test procedure table are automatically loaded in the main storage 22 from a program storage (external storage) in the device 27 to be tested. The non-volatile memory 26 comprises the pointer area 210 of the test procedure table, the area 211 for storing the number of normal completions of testing and the area for 212 for logging error messages. The contents of the non-volatile memory 26 are initialized in the initial testing step as shown in FIG. 1. In the steps subsequent to step 2 shown in FIG. 1, each time the power is turned on, the CPU 21, referring to a pointer corresponding to the test procedure table 29 from the memory 26, performs the test corresponding to a test item and a test procedure indicated by the pointer on the table. After the completion of the test, the CPU 21 updates the value of the pointer 210.

If the test results in normal completion, the number of normal completions of testing stored in the non-volatile memory 26 will be updated. If the test results in abnormal completion, i.e., error completion, the normal completion number will not updated, but the error message indicative of the error completion will be stored in the error message logging area 212 of the non-volatile memory 26. Again, the CPU 21, referring to the above pointer area, performs the test corresponding to a test item and a test procedure indicated by a pointer on the test procedure table 29. Sequentially, the above test processing will be performed repeatedly for each process.

Additionally, the test procedure table 29 also includes procedures for varying the voltage during a testing step, and for standing-by until the turning-off operation for shifting to the subsequent step. In the final recognition step, as an indication of the processing of the test procedure table corresponding to the pointer, the number of normal completions of testing and the contents of the error message logging are displayed, or printed out as required. An operator for the final recognition step can immediately evaluate the test results through the display or print-out thereof.

In accordance with this embodiment, a prescribed combination of tests corresponding to several external changes such as environment change, temperature/humidity change and voltage variation can be successively performed for the information processing devices while in the unattended state and also the test results can be immediately evaluated.

A refresh memory, which requires refreshing for holding written information, can also be tested by providing a test procedure in the procedure table 29 so that the written information will be read out after the elapse of a predetermined time.

An information processing device having a mechanism for varying the power supply voltage, in accordance with a program can be tested by providing a procedure of varying the voltage in the procedure table 29.

A write test for a write-once type non-volatile recording media (e.g. optical disk) can be performed by referring to and updating a write-enable address previously arranged thereon. In this case, at least one write-enable address should be arranged on the recording medium.

FIG. 3 is an operation flow chart of a testing method in accordance with one embodiment of the present invention.

First, in response to power-on, the test program 28 and the procedure table 29 are loaded in the main storage 22 in the CPU 21 from an external memory, for example (Step 101). Next, an operator indicates whether the non-volatile memory 26 has been initialized or not (Step 102). If initialization has occurred, it is then whether or not the conveyer with a test object located thereon, has been shifted to the subsequent testing step (second step in this embodiment) (Step 103). If the shifting has been completed, the power for that subsequent testing step is turned on (Step 104). Then, referring to the pointer to that step, through the non-volatile memory 26, the test program 28 is executed in accordance with the procedure described on the table 29 (Step 105). After the test has been completed (Step 106), whether or not the test result is normal is decided in the instruction analysis mechanism 23 (Step 107). If the test result is normal, the area 211 of storing the number of normal completions of testing is updated (Step 108). If the test result is abnormal (error completion), an error message is stored in the error message logging area 212 (Step 109). In detail, the test program includes a control portion and a plurality of test program execution portions or test portions (1, 2, --- n) executed under control of the control portion. The test program control portion fetches an address on the procedure table, designated by a pointer from the pointer area 210, and determines which test on the table 29 is to be executed, and then updates the content of the pointer area to indicate the next address on the table. The designated test portion performs the test indicated by the pointer on the table, and the control portion receives a test result from the corresponding test program execution portion. Now, the test portion judges whether the test result is normal or not and reports a result of the judgement to the control portion and reports types of error when the test result is abnormal. Then, the control portion serves to count up the memory area 211 when the test portion reports that the test result is normal, and serves to edit error information on the test result when it is abnormal and accumulatively stores the error information in the memory area 212. Until the pointers 210 are completed, i.e., the test steps of second to (n−2)-th steps have been completed, the above processings of Steps 103 to 109 will be repeated.

As explained above, in accordance with the present invention, a plurality of steps including the tests within a testing bath for information processing devices can be run without any operator, so that human intervention in the testing procedure can be minimized. Further, erroneous operation due to the operation by an operator can be prevented and safety can be assured. Also, testing of a large amount of devices can be realized.

What is claimed is:

1. A method of successively testing a plurality of information processing devices, each including a processor, a main storage, and a non-volatile read/write enable storage, in a plurality of test steps in accordance with test programs under a plurality of physical condition environments, comprising the steps of:
   (a) preparing test items and test procedures in a procedure table which are different for respective test steps of a specific one of said plurality of information processing devices,
   (b) storing a pointer for designating a test item and a test procedure from said procedure table to be executed, in said non-volatile storage;
   (c) in response to power-on of the specific device in an initial step, loading said test program and said procedure table in the main storage of the specific device and initializing contents of said non-volatile storage in the initial test step;
   (d) under control of the test program, reading the processor to refer to the pointer in said non volatile storage each time a test item in said table is completed and performing the test of a subsequent test item described in said table corresponding to said pointer referred to; and
   (e) updating the value of the pointer in said non-volatile storage upon each completion of a test procedure to repeat said referring to and performing steps until testing of all of the test items in the table has been completed.

2. A method of testing information processing devices according to claim 1, wherein an instruction for performing the read/write test for information recording devices under different temperature/humidity environments is described in said procedure table to automatically test said information recording devices.

3. A method of testing information processing devices according to claim 1, wherein said procedure table holds an instruction for performing a test of a refresh memory as said main storage or as an associated device, which requires refreshing to hold written information, instructing that the written information will be read out after elapse of a predetermined time after said written information is stored in the refresh memory, to thereby automatically test the refresh memory.

4. A method of testing information processing devices according to claim 1, wherein said procedure table stores an instruction for varying the power supply voltage for information processing devices that have means for varying the power to thereby automatically test the devices using different powering voltages in respective test steps.

5. A method of testing information processing devices according to claim 1, wherein a write enable address is previously stored in said read/write enable non-volatile memory to thereby automatically perform a write test for write-once type recording media in such a way that said test program refers to said address and update it.

6. A method of testing information processing devices according to claim 1, further comprising the step of storing the test results for the respective test steps in said read/write non-volatile memory and displaying the test results edited in the form of a list after the completion of all the tests in accordance with the test programs.

7. A method of testing information processing devices according to claim 1, wherein said plurality of physical condition environments include a series of test baths having different temperatures/humidities along a test line, said test steps being performed in the corresponding test baths, and each time a test object is shifted upon the completion of the test in each test step, a subsequent test step is started in response to power-on of the information processing device.

8. A method of testing information processing devices according to claim 1, wherein said step (a) includes preparing said test procedure table and said test program in a program storage device which is a component of the information processing device which is to be tested.

9. In an information processing device to be subjected to a plurality of test steps in accordance with test programs under a plurality of physical condition environments, the improvement comprising:
  a central processing unit including a main storage, said main storage storing a test program and a test procedure table, said test procedure table storing a plurality of test items and test procedures for each test step to which the device is to be subjected; and
  a non-volatile memory including a procedure table pointer designating an area in said test procedure table to be accessed to retrieve test items and a test procedure to be performed, and wherein upon completion of a test procedure said pointer is updated to designate area in said test procedure table to be accessed in performing the next test procedure.

10. The device of claim 9 further comprising:
  an instruction analysis mechanism for analyzing results of testing procedures; and
  means, responsive to said instruction analysis mechanism, for storing indicators of test procedure results.

11. The device of claim 10 wherein said means for storing indicators comprises a storage area in said non-volatile memory storing a number of normal completions of procedure steps.

12. The device of claim 11 wherein said means for storing comprises a storage area in said non-volatile memory storing error messages indicating errors occurring during implementation of procedure steps.

13. The device of claim 12 wherein said instruction analysis mechanism is incorporated in said central processing unit.

14. The device of claim 9 wherein said procedure table stores test items and test procedures for performing a read/write test for a recording device under different temperature/humidity environments.

15. The device of claim 9 wherein said test procedure table holds an instruction for performing a test of a refresh memory as part of said main storage, which requires refreshing to hold written information, said instruction instructing that the written information will be read out after written information is stored in the refresh memory to thereby automatically test the refresh memory.

* * * * *

UNITED STATES PATENT AND TRADEMARK OFFICE
CERTIFICATE OF CORRECTION

PATENT NO. : 5,107,498
DATED : 21 April 1992
INVENTOR(S) : Toshio HAGIHARA et al.

It is certified that error appears in the above-indentified patent and that said Letters Patent is hereby corrected as shown below:

| Column | Line | Corrections |
|---|---|---|
| TITLE PAGE | | Change "[73] Assignees: Hitach, Ltd.," to --[73] Assignees: Hitachi, Ltd.,-- |
| ABS. | 1 | After "method" insert --to--. |
| ABS. | 2 | After "vices" delete ",". |
| 1 | 38 | After "not" delete ";". |
| 2 | 13 | Delete "are initialized". |
| 2 | 61 | Change "power" to -- power-on --. |
| 2 | 64 | After "moved" delete ","; after "location" insert --,--. |
| 4 | 4 | After "object" delete ";". |
| 4 | 5 | After "below" insert --;--. |
| 4 | 44 | Before "device" insert --information processing--. |
| 5 | 48 | After "then" insert --determined--. |
| 5 | 49 | After "conveyer" insert --,--. |

UNITED STATES PATENT AND TRADEMARK OFFICE
CERTIFICATE OF CORRECTION

PATENT NO. : 5,107,498
DATED : 21 April 1992
INVENTOR(S) : Toshio HAGIHARA et al.

It is certified that error appears in the above-indentified patent and that said Letters Patent is hereby corrected as shown below:

| Column | Line | Corrections |
|--------|------|-------------|
| 5 | 60 | After "211" change "of" to --for--. |

Signed and Sealed this

Twelfth Day of October, 1993

Attest:

BRUCE LEHMAN

Attesting Officer

Commissioner of Patents and Trademarks